2 Sheets--Sheet 1.

DENNIS LANE.

Improvement in Head Blocks.

No. 4,745. Reissued Feb. 6, 1872.

Witnesses.
Villette Anderson.
Frank B. Curtis

Inventor
Dennis Lane,
Chipman Hosmer & Co
Attys

AM. PHOTO-LITHOGRAPHIC CO. N.Y. (OSBORNE'S PROCESS.)

DENNIS LANE. 2 Sheets--Sheet 2.

Improvement in Head Blocks.

No. 4,745. Reissued Feb. 6, 1872.

Witnesses
Villette Anderson
F. B. Curtis.

Inventor.
Dennis Lane,
Chipman & Osmer & Co.
Attys

AM. PHOTO-LITHOGRAPHIC CO. N.Y. (OSBORNE'S PROCESS.)

UNITED STATES PATENT OFFICE.

DENNIS LANE, OF MONTPELIER, VERMONT.

IMPROVEMENT IN HEAD-BLOCKS.

Specification forming part of Letters Patent No. 32,774 dated July 9, 1861; reissue No. 2,872, dated February 18, 1868; reissue No. 4,745, dated February 6, 1872.

*To whom it may concern:*

Be it known that I, DENNIS LANE, of Montpelier, in the county of Washington and State of Vermont, have invented certain Improvements in Head-Blocks; and I do hereby declare that the following is a full, clear, and exact description of the construction and operation of the same, reference being had to the accompanying drawing making a part of this specification, in which—

Figure 2:
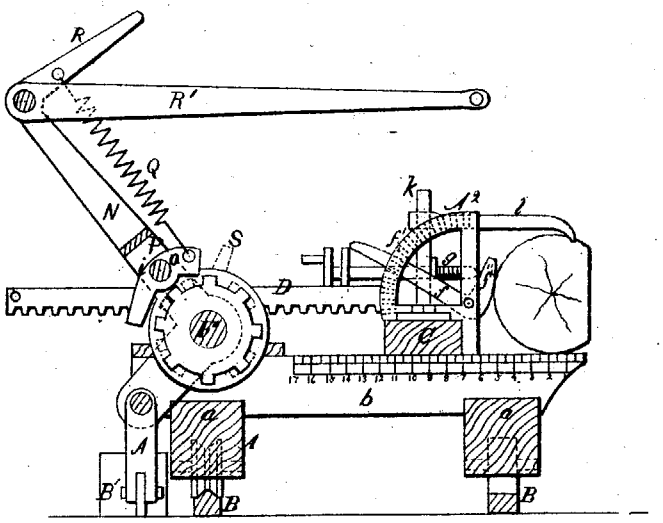
Figure 1:
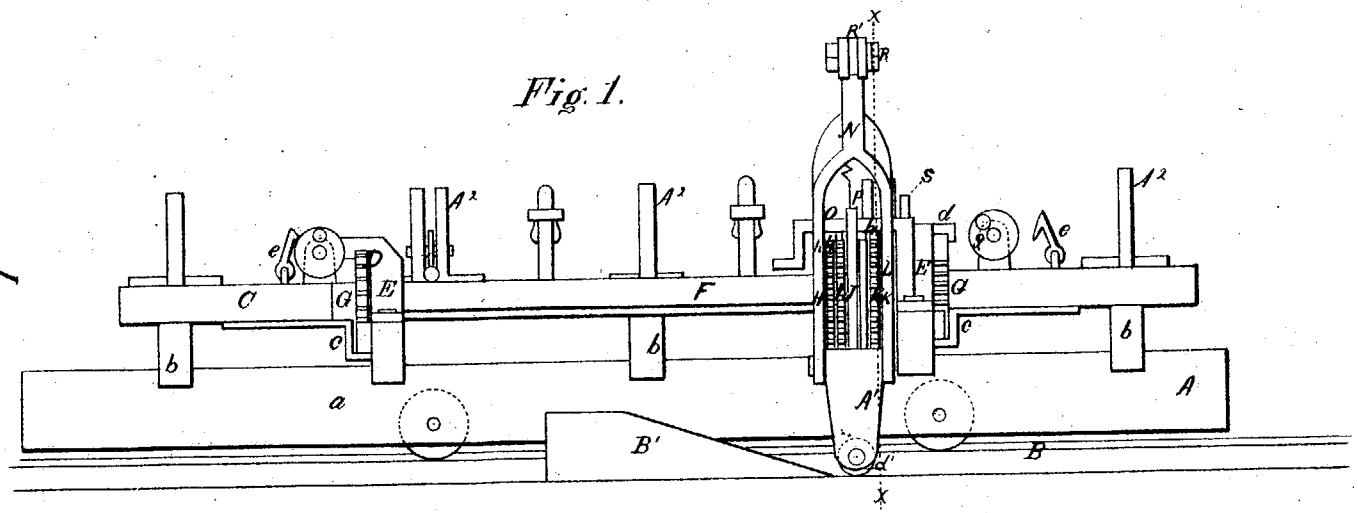
Figure 5:
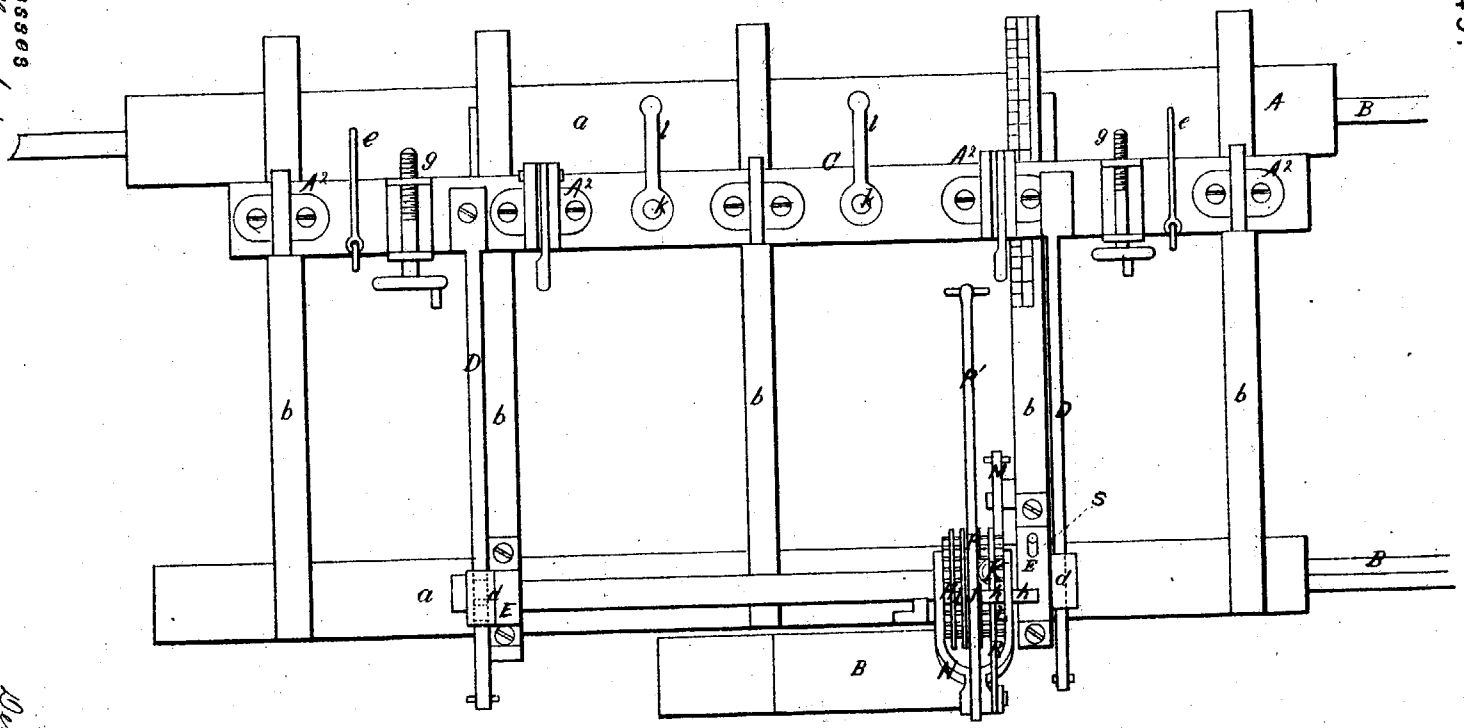

Figure 1 is a perspective view. Fig. 2 is a cross-section; and Fig. 3 is a plan view.

The object of this invention is to provide a means for setting the log upon the carriages of saw-mills, which will admit of the adjustment, by a single attendant, of the log to the saw, and the operation by him of the brakes for feeding and gigging back the carriage. The invention has also for its object the ready adaptation of the parts for adjusting the log to saw boards of different thicknesses. The object is also to provide the setting-up bar or slide of the carriage with one or more dogs for securing the log to the carriage, said dogs being of such nature that they will hold the work firmly, and prevent it from being sprung or tipped by the action of the saw. It is also designed to provide one or more of the side rests or bearings of the setting-up bar, with suitable devices for adjusting the rests out more or less from the setting-up bar, according as it may be found necessary for the proper adjustment of the log.

In the drawing, the letter A designates the carriage; B B, the ways or guides on which it is placed and allowed to work freely. The carriage is formed of two parallel bars, *a a*, connected by head-blocks *b b*. C is the setting-up bar or slide, made of wood or other suitable material, and placed on the head-blocks *b b*, parallel or nearly so with the bars *a a*. This bar C is allowed to work freely on the head-blocks *b b*, and is kept in position by guides *c c*, shown in Fig. 1. To the bar C two racks, D D, are attached at right angles. These racks pass through guides *d d*, which are, at the upper parts of the bearings E E of a shaft, F, which shaft has a pinion, G, at each end, said pinions gearing into the racks D D. On the bar C are placed the usual dogs, *e e*, also screws *g g*, for securing the log, with reference to the bar C. Uprights $A^2$ are also attached to said bar C at various points of its length. These uprights $A^2$ project from the edge of the bar C, and thus, while forming side rests for the log, at the same time accommodate any knots or protuberances in the length of the log, and are sufficiently extended above the bar for any thickness of log. These uprights $A^2$ are designed to be sufficient in number to afford a side support to logs of different lengths to prevent the log when somewhat thinned or sawed away from springing while being finished up. *l l* are dogs, arranged to slide up and down on posts *k k*, secured to the bar C. These dogs are designed for securing the log while being sawed, and they operate in an efficient manner to prevent all possibility of tipping or inclination of the log by the action of the saw. On the shaft F there is placed side by side a series of ratchet-wheels, H I J K, the teeth of which are placed at different distances apart, the object being to regulate the thickness of board. These ratchet-wheels usually move together, and may, although more conveniently made separately, be manufactured entire. On the shaft F there is also placed a ratchet, L, into which a retaining-pawl, M, catches. N is a forked lever, which is fitted on the shaft F, the forked end of the lever embracing the ratchets, as shown clearly in Figs. 1 and 3. In the forked part of the lever N there is fitted transversely a rod, O, on which a dog, P, is placed loosely. This dog P is allowed to slide on the rod O, and it may be adjusted so as to engage with any of the ratchets H I J K, the dog being retained in proper position by means of the pins *h* on the rod O. When the rod O is turned so that the pins *h* will be at the upper side of the rod, the dog P may be moved along on the rod, the pins *h* passing through the slot *i* in the dog, as indicated in Fig. 2. The dog P is connected by a spiral spring, Q, with a lever, R, attached to the outer end of the forked lever N, to which is also attached a lever, R′. S is a pin or stop attached to the bearing E, adjoining the ratchets. This stop S determines the extent of the inward movement of the lever N.

From the above description it will be seen that the bar C may be moved laterally on the carriage A by actuating the forked lever N, the dog P engaging with one of the ratchets H I J or K, and thereby turning the shaft F, the pinions G of which move the racks D. This movement of the bar C sets the log to the saw, and the log may therefore be sawn into boards of different thickness, as may be required. The dog P may be freed from any of the ratchets by raising the lever R. The bar C may be moved or adjusted back to its original position by lifting the dog P, disengaging the pawl M, and moving the bar C back.

$A^1$ represents a pendant attached to the lever N, and provided with a friction-roller, $d'$, at its lower end, by which it passes up over an inclined bar or plane, B′, as the carriage moves, and thus produces an automatic operation of the setting-up devices through the lever N. For different lengths of log the position of the inclined plane may be changed.

In the drawing two of the uprights $A^2$, constituting the side rests or bearings for the log on the carriage, are shown as provided with means by which the projection of the side rest or bearing beyond the edge of the setting-up bar can be effected, according to requirement. For this purpose a cam-lever, $f$ is employed, said lever being pivoted to the upright $A^2$ in such a manner that the bearing portion $f''$ of the lever may be advanced more or less from the face of the upright, thus setting off the log on the carriage therefrom. This lever $f$ is designed to be held in place after adjustment by a ratchet, $f'$, on the upright or other suitable device.

Having thus described my invention, what I claim as new, and desire to secure by Letters Patent, is—

1. In a saw-mill, a dog and a series of differently-graduated ratchets H I J K, for the purpose of varying the thickness of the boards, substantially as specified.

2. The combination of the setting-up bar and head-blocks of a saw-mill carriage, with a fixed post, $k$, and sliding dog arranged to bind in the eye against said post, substantially as specified.

3. The combination of the setting-up bar C and head-blocks $b$ of a saw-mill carriage, with adjustable bearings $f''$ for supporting the log, substantially as specified.

4. The combination of a weighted double-acting pawl P, flexible connection Q, and operating lever N, provided at its upper end with a lever for reversing the action of the pawl with reference to its ratchet, substantially as specified.

In testimony that I claim the foregoing I have hereunto subscribed my name in the presence of two witnesses.

Attest: DENNIS LANE.

F. B. CURTIS,
DENNIS D. KANE.